(12) United States Patent
Kakuda

(10) Patent No.: US 10,623,599 B2
(45) Date of Patent: Apr. 14, 2020

(54) DOCUMENT READER

(71) Applicant: PFU LIMITED, Kahoku-shi, Ishikawa (JP)

(72) Inventor: Hirotoshi Kakuda, Kahoku (JP)

(73) Assignee: PFU LIMITED, Kahoku-Shi, Ishikawa (JP)

( * ) Notice: Subject to any disclaimer, the term of this patent is extended or adjusted under 35 U.S.C. 154(b) by 0 days.

(21) Appl. No.: 16/467,915

(22) PCT Filed: Dec. 12, 2016

(86) PCT No.: PCT/JP2016/086937
§ 371 (c)(1),
(2) Date: Jun. 7, 2019

(87) PCT Pub. No.: WO2018/109811
PCT Pub. Date: Jun. 21, 2018

(65) Prior Publication Data
US 2019/0342466 A1  Nov. 7, 2019

(51) Int. Cl.
*H04N 1/04* (2006.01)
*H04N 1/107* (2006.01)
(Continued)

(52) U.S. Cl.
CPC ......... *H04N 1/107* (2013.01); *H04N 1/00795* (2013.01); *H04N 1/1065* (2013.01)

(58) Field of Classification Search
CPC ... H04N 1/107; H04N 1/00795; H04N 1/1065
(Continued)

(56) References Cited

U.S. PATENT DOCUMENTS 5,790,211 A * 8/1998 Seachman .......... H04N 1/00795
                                            349/113
6,208,438 B1 * 3/2001 Watanabe .......... H04N 1/00795
                                            355/75
(Continued)

FOREIGN PATENT DOCUMENTS

| JP | 2001-268367 A | 9/2001 |
| JP | 2003-075939 A | 3/2003 |
| JP | 2005-121942 A | 5/2005 |

OTHER PUBLICATIONS

International Search Report dated Mar. 7, 2017 for corresponding PCT Application No. PCT/JP2016/086937 (3 pages) with English Translation (2 pages).
(Continued)

*Primary Examiner* — Cheukfan Lee
(74) *Attorney, Agent, or Firm* — Lewis Roca Rothgerber Christie LLP

(57) ABSTRACT

Provided is a document reading apparatus wherein plurality of color reference boards can be flexibly changed. A document reading apparatus includes a document reading module, a document cover provided at a position where the document cover faces against the document reading module, an abutment portion provided in the document cover, a plurality of color reference boards detachably set up relative to the document cover, and a coupling portion that couples the plurality of color reference boards together and that abuts against the abutment portion. Each of the plurality of color reference boards includes a surface that faces against the document reading module and that has different reflectance.

6 Claims, 12 Drawing Sheets

(51) Int. Cl.
*H04N 1/00* (2006.01)
*H04N 1/10* (2006.01)

(58) Field of Classification Search
USPC .................. 358/497, 488, 474, 505; 399/380
See application file for complete search history.

(56) References Cited

U.S. PATENT DOCUMENTS

| | | | | |
|---|---|---|---|---|
| 6,587,233 B1 * | 7/2003 | Salgado | ............. | H04N 1/00551 |
| | | | | 358/474 |
| 6,930,804 B2 * | 8/2005 | Farrell | ............... | H04N 1/00681 |
| | | | | 358/3.15 |
| 7,382,500 B2 * | 6/2008 | Payne | ................ | H04N 1/00702 |
| | | | | 271/186 |
| 8,259,316 B2 * | 9/2012 | Yanagawase | ...... | G03B 27/6221 |
| | | | | 358/1.12 |
| 8,659,808 B2 * | 2/2014 | Huang | .................... | H04N 1/04 |
| | | | | 358/406 |
| 9,769,353 B2 * | 9/2017 | Yoshita | ............. | H04N 1/00891 |
| 9,942,432 B2 * | 4/2018 | de Echaniz | ........ | H04N 1/00912 |

OTHER PUBLICATIONS

Written Opinion dated Mar. 7, 2017 for corresponding PCT Application No. PCT/JP2016/086937 (3 pages) with English Translation (4 pages).
International Preliminary Report on Patentability dated Jun. 18, 2019 for corresponding PCT Application No. PCT/JP2016/086937 (4 pages).

* cited by examiner

DOCUMENT READER

CROSS-REFERENCE TO RELATED APPLICATION(S)

This application is a U.S. National Phase Patent Application and claims priority to and the benefit of International Application Number PCT/JP2016/086937, filed on Dec. 12, 2016, the entire contents of which are incorporated herein by reference.

FIELD

The present disclosure relates to a document reading apparatus, and more particularly to a document reading apparatus including a color reference board.

BACKGROUND

Generally speaking, a document reading apparatus that reads a document to generate image data such as a scanner includes, to correctly identify an area of the document from the scanned image data, a color reference board having a color different from a background color of the document on the opposite side, across the document, of a document reading module. In such a document reading apparatus, to correctly identify an area of each document of a plurality of documents each having a different color, a plurality of color reference boards each having a different color are preferably used.

There is disclosed a document reading apparatus, which includes a detachable clamping member having two contacting surfaces that cause a document placed on a document platen glass of a main body to be in close contact with the document platen glass, in the document reading apparatus, to enable a color of the surface that clamps the document to be selectively changed according to a type of the document to be read, each of the two contacting surfaces is configured to have a different color (refer to PTL 1).

CITATIONS LIST

Patent Literature

Patent literature 1: Japanese Unexamined Patent Publication (Kokai) No. 2003-75939

SUMMARY

It has been desired that a document reading apparatus including a plurality of color reference boards enables a color reference board to be used to be flexibly changed according to a background color of a document to be read.

An object of the document reading apparatus is to enable a plurality of color reference boards to be flexibly changed.

The document reading apparatus according to an embodiment includes a document reading module, a document cover provided at a position where the document cover faces against the document reading module, an abutment portion provided in the document cover, a plurality of color reference boards detachably set up relative to the document cover, and a coupling portion that couples the plurality of color reference boards together and that abuts against the abutment portion. Each of the plurality of color reference boards includes a surface that faces against the document reading module and that has different reflectance.

According to the present embodiment, the document reading apparatus enables the plurality of color reference boards to be flexibly changed.

The object and advantages of the invention will be realized and attained by means of the elements and combinations, in particular, pointed out in the claims. It is to be understood that both the foregoing general description and the following detailed description are exemplary and explanatory, and are not restrictive of the invention, as claimed.

DESCRIPTION OF EMBODIMENTS

Hereinafter, a document reading apparatus according to an embodiment, will be described with reference to the drawings. However, it should be noted that the technical scope of the invention is not limited to these embodiments, and extends to the inventions described in the claims and their equivalents.

First Embodiment

Figure 1:
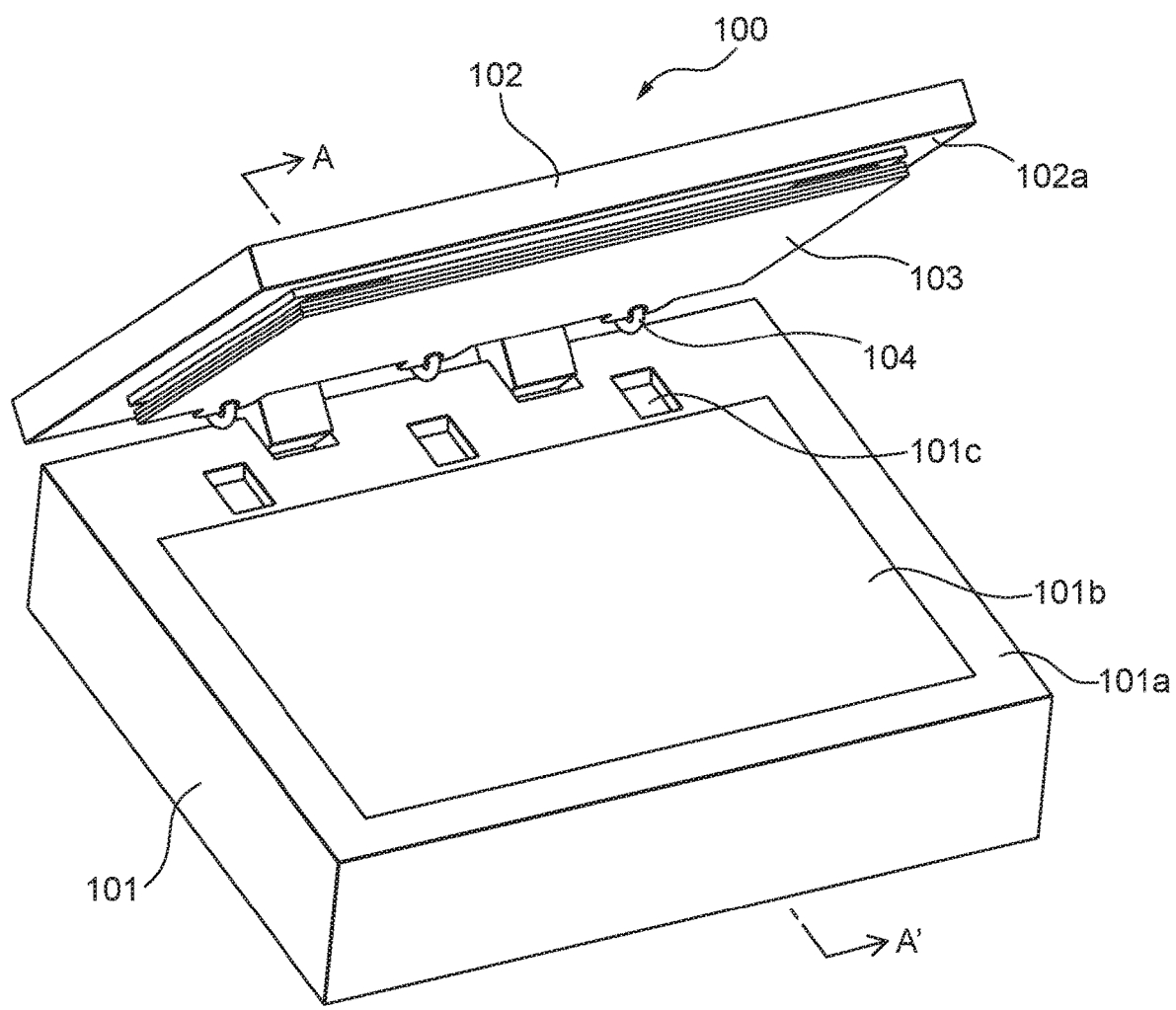
FIG. 1 is a configuration diagram of an example of a document reading apparatus according to a first embodiment.

FIG. 1 is a configuration diagram of an example of a document reading apparatus according to a first embodiment.

The document reading apparatus of the present embodiment is configured as a document reading apparatus 100 such as an image scanner. In FIG. 1, the document reading apparatus 100 is illustrated in a perspective view.

The document reading apparatus 100 includes a housing 101, a document cover 102, a plurality of color reference boards 103 and ring members 104, etc.

The housing 101 includes a glass plate 101b, a recessed portion 101c, etc., in an upper surface 101a.

The glass plate 101b is a member on which a document to be read is placed.

The recessed portion 101c is formed at a position where the glass plate 101b is not disposed on the upper surface 101a and where the recessed portion 101c faces against the ring member 104 when the document cover 102 is closed. Since the ring member 104 is housed in the recessed portion 101c when the document cover 102 is closed, the color reference board 103 can appropriately come into contact with the glass plate 101b.

The document cover 102 is set up in such a way that it can be opened and closed relative to the housing 101; when the document cover 102 is open, a document can be placed on the upper surface 101a of the housing 101; when the document cover 102 is closed, an underside 102a of the document cover 102 faces against an imaging unit provided under the glass plate 101b (inside the housing 101).

The plurality of color reference boards 103 are set up, on the underside 102a of the document cover 102, to be detachable relative to the document cover 102.

The ring member 104 is an example of a coupling portion and couples the plurality of color reference boards 103 together.

Figure 2A:
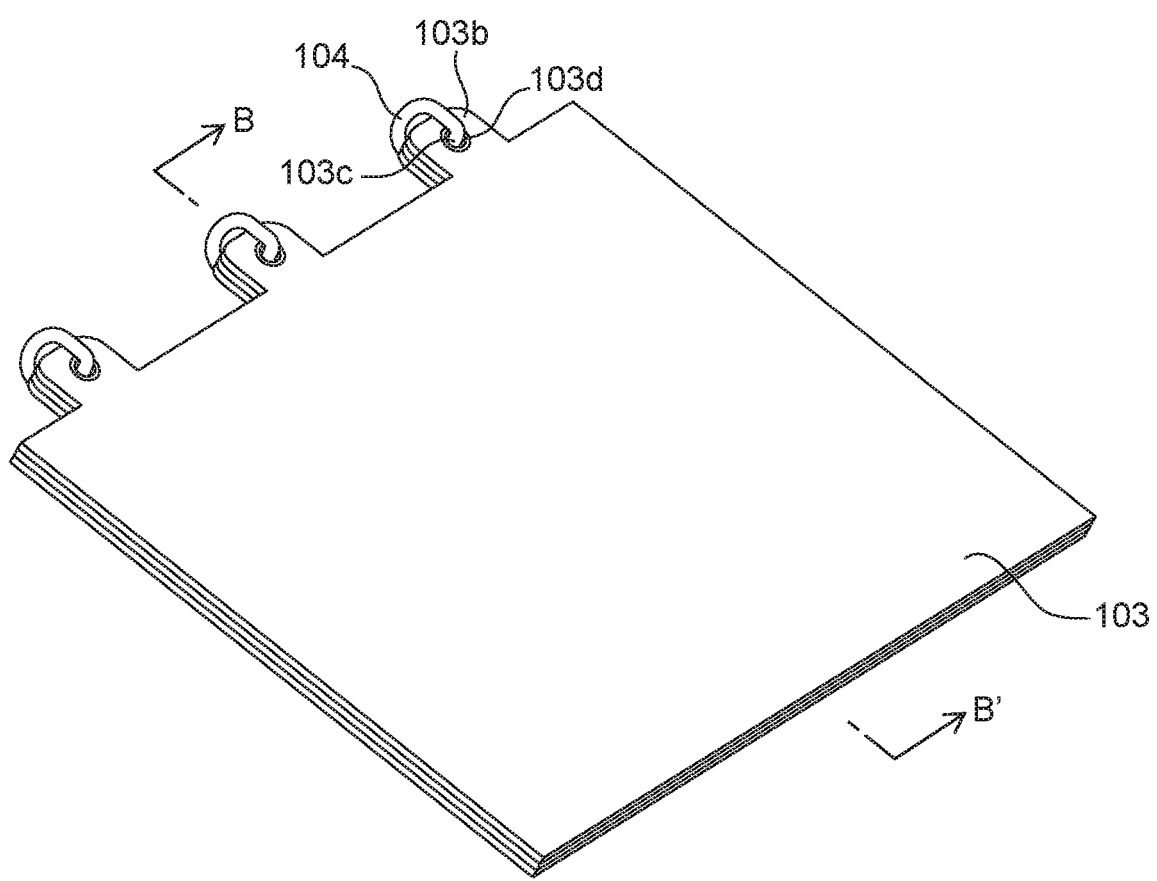
FIG. 2A is a perspective view of a plurality f color reference boards 103 and ring members 104.
Figure 2B:
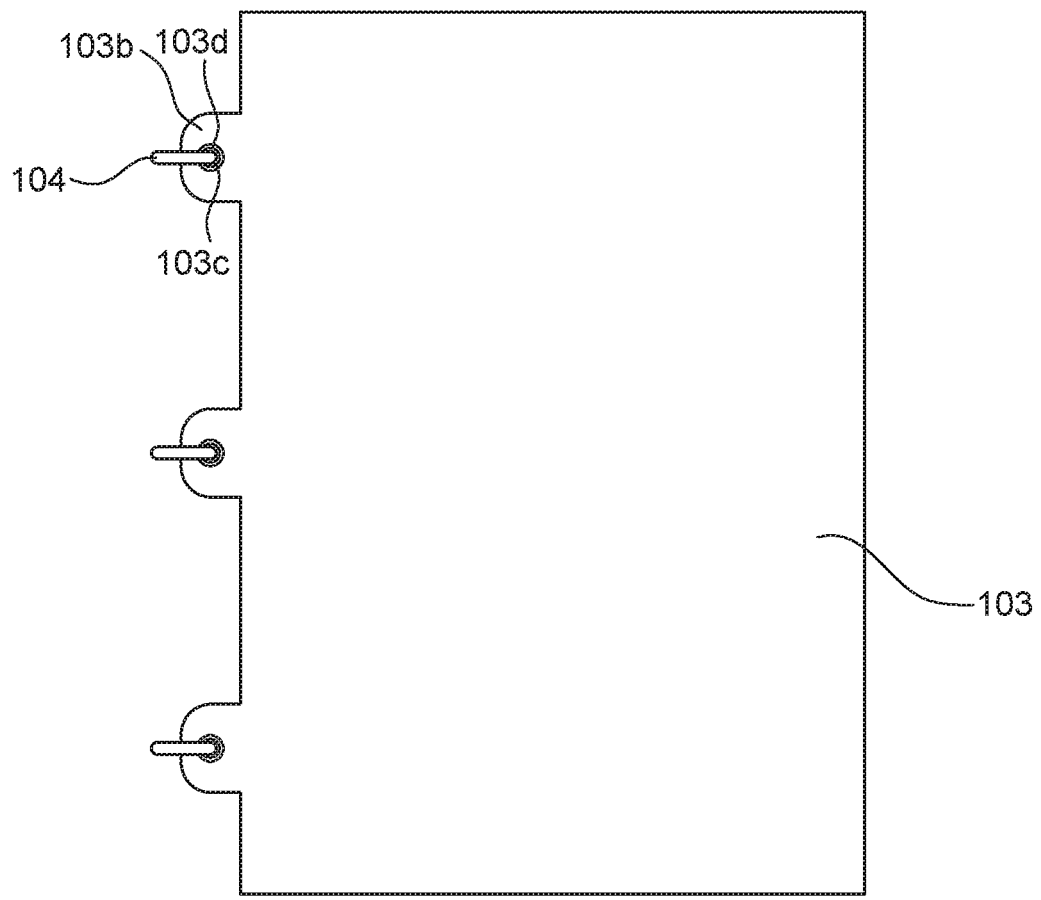
FIG. 2B is a plan view of a plurality of color reference boards 103 and the ring members 104.
Figure 2C:
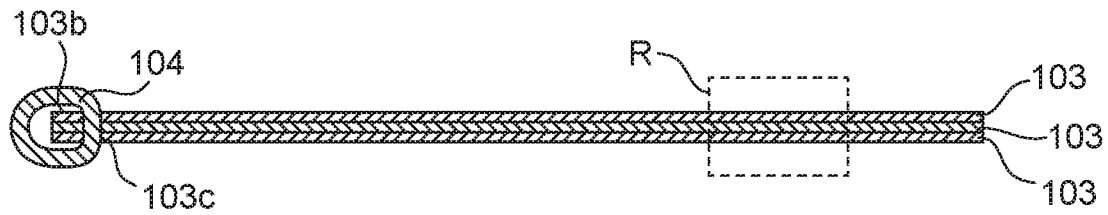
FIG. 2C is a cross-sectional view of a plurality of color reference boards 103 and the ring members 104 illustrated in FIG. 2A taken along a line B-B'.

FIGS. 2A, 2B, and 2C are diagrams for describing the plurality of color reference boards 103 and the ring members 104, and illustrates the plurality of color reference boards 103 and the ring members 104 when they are detached from the document cover 102. FIG. 2A is a perspective view of the plurality of color reference boards 103 and the ring members 104, FIG. 2B is a plan view of the plurality of color reference boards 103 and the ring members 104, and FIG. 2C is a cross-sectional view of the plurality of color reference boards 103 and the ring members 104 illustrated in FIG. 2A taken along a line B-B'.

As illustrated in FIGS. 2A, 2B, and 2C, a plurality of color reference boards 103 include three color reference boards 103. The number of the plurality of color reference boards 103 may be any number as long as it is two or more. Each color reference board 103 is formed to be planar, and has a substantially rectangular shape having protruding portions 103b formed on one side. The number of the protruding portions 103b may be any number as long as it is one or more. In each protruding portion 103b, a through-hole 103c is formed. On a circumferential portion of each through-hole 103c, to prevent the through-hole 103c from being worn or damaged, a protector 103d such as a crimped portion, a seal, or a plastic is provided.

The ring member 104 has a D-ring shape, and by configuring the ring member 104 to pass through the through-hole 103c formed in each color reference board 103, the ring member 104 couples the color reference boards 103 together.

Figure 3:
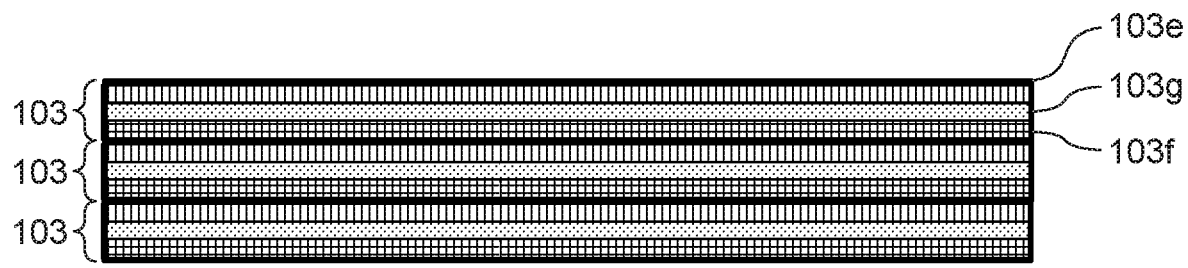
FIG. 3 is an enlarged view of an area R illustrated in FIG. 2C.

FIG. 3 is a diagram for describing the color reference board 103, and is an enlarged view of an area R illustrated in FIG. 2C.

As illustrated in FIG. 3, each color reference board 103 includes a first document backing surface 103e, a second document backing surface 103f, and a magnet member 103g. The first document backing surface 103e and the second document backing surface 103f are set up to clamp the magnet member 103g. A surface of each first document backing surface 103e and each second document backing surface 103f of the plurality of color reference boards 103, which does not face against the magnet member 103g, may be attached to the document cover 102 in such a way that the surface faces against the imaging unit through the glass plate 101b when the document cover 102 is closed. A surface of each first document backing surface 103e and each second document backing surface 103f of the plurality of color reference boards 103, which does not face against the magnet member 103g, has different reflectance.

Each document backing surface has different reflectance, for example, with each surface having a different color such as white, black, gray, red, green, and blue. For example, reflectance of white is 75%, reflectance of black is 3%, reflectance of gray is 40%, reflectance of red is 20%, reflectance of green is 40%, and reflectance of blue is 30%. Each document backing surface may have different reflectance with each surface having a different surface condition due to different surface finishing such as burnishing or matting. For example, reflectance of a white burnished document backing surface is 75% while reflectance of a white matted document backing surface is 60%. Each reflectance may vary within a certain range relative to the aforementioned value.

The magnet member 103g is a permanent magnet such an alnico magnet, a ferrite magnet, or a neodymium magnet.

Figure 4:
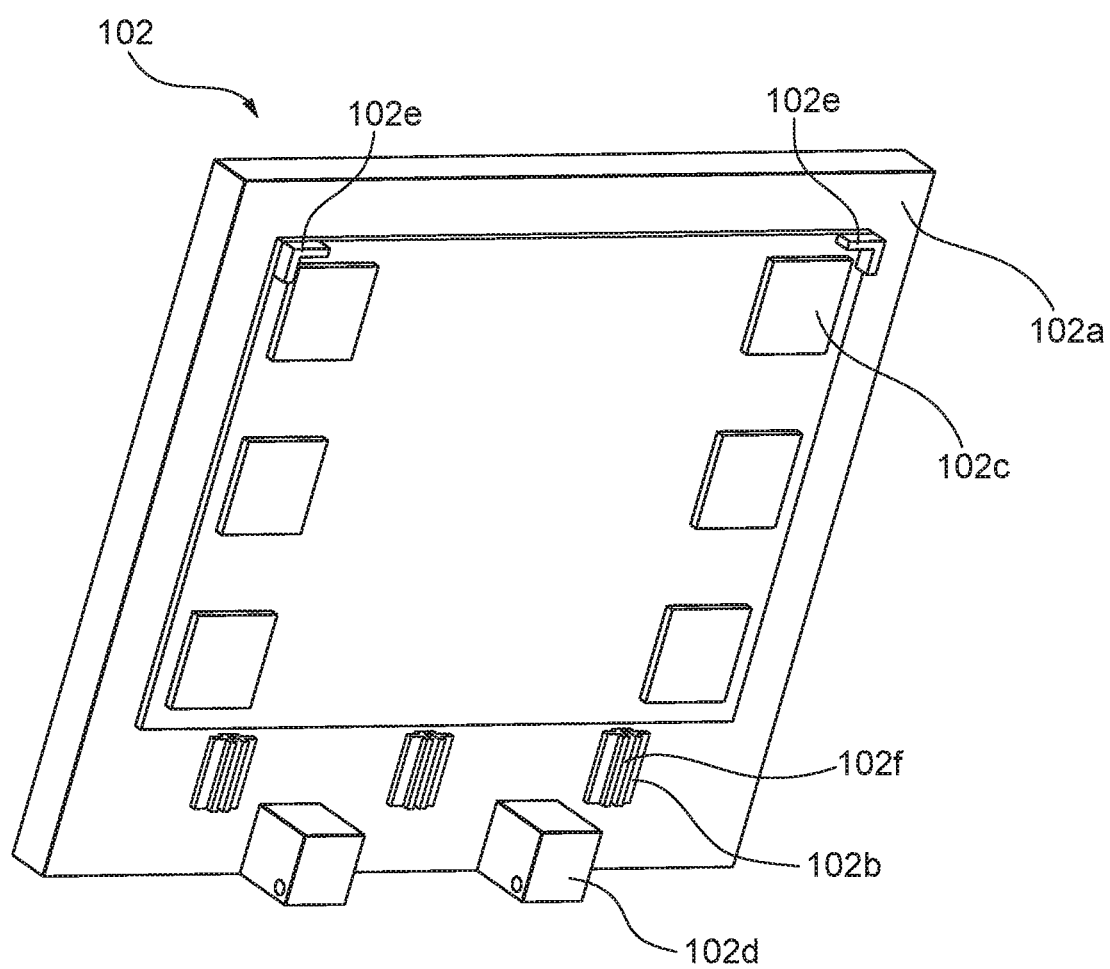
FIG. 4 is a perspective view of a document cover 102 detached from a housing 101, viewed from below.

FIG. 4 is a perspective view of the document cover 102 detached from the housing 101, viewed from below.

As illustrated in FIG. 4, the document cover 102 includes, on the underside 102a, locking members 102b, a magnetic member 102c, engaging members 102d, stoppers 102e, etc.

The locking member 102b is an example of an abutment portion, which is provided on the document cover 102, that abuts against the ring member 104, and locks the ring member 104. The number of the locking members 102b to be provided is the same as that of the ring members 104. The locking member 102b is formed of an elastic member such as rubber, and includes a recessed portion 102f that can clamp the ring member 104.

The magnetic member 102c is a magnetic member that attracts and is attracted to the magnet member 103g included in the plurality of color reference boards 103, and is attached to the document cover 102 with an adhesive, etc. The magnetic member 102c is a ferromagnet such as iron, cobalt, nickel, or gadolinium. The number of the magnetic members 102c may be any number as long as it is one or more. The document cover 102 and the color reference board 103 may be configured any way as long as they are attracted to each other; for example, the document cover 102 may include, instead of the magnetic member 102c, a magnet member that is a permanent magnet. The document cover 102 may include, instead of the magnetic member 102c, a magnet member while the color reference board 103 includes, instead of the magnet member 103g, a magnetic member.

The engaging member 102d rotatably engages with the housing 101 in such a way that the document cover 102 can be opened and closed relative to the housing 101.

The stopper 102e is a member against which a corner of the plurality of color reference boards 103 abut. The stopper 102e may be omitted.

Figure 5:
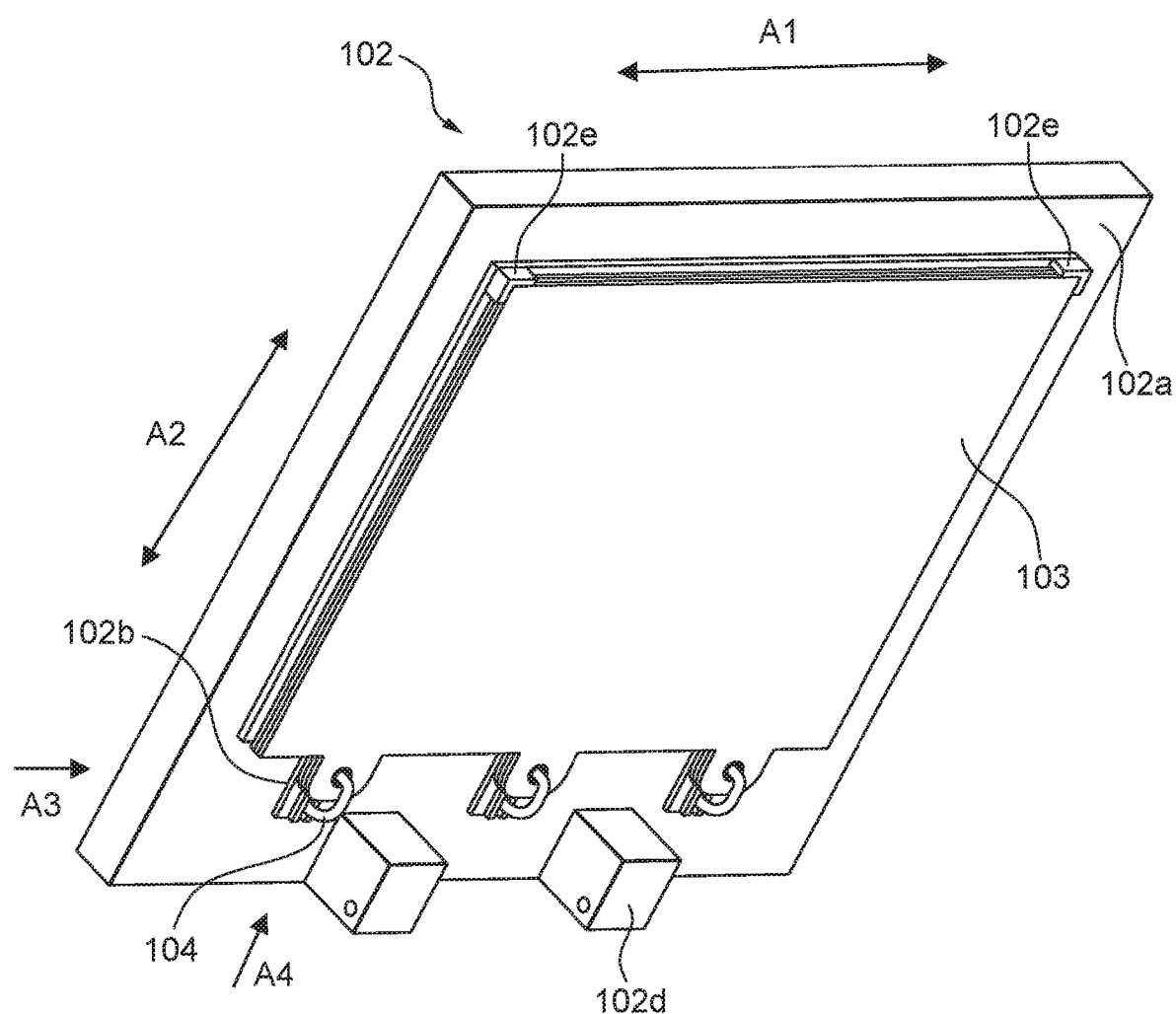
FIG. 5 is a schematic diagram of the document cover 102 and a plurality of color reference boards 103.

FIG. 5 is a schematic diagram illustrating a state in which a plurality of color reference boards 103 are attached to the document cover 102 illustrated in FIG. 4.

As illustrated in FIG. 5, by locking the ring member 104 in the locking member 102b, the plurality of color reference boards 103 are attached to the document cover 102. The locking member 102b also serves as a portion for positioning the plurality of color reference boards 103, and by locking the ring member 104 in the locking member 102b, the position of the plurality of color reference boards 103 relative to the document cover 102 (particularly a position in a direction of an arrow A1 in FIG. 5) can be fixed, in this manner, the color reference board 103 may be reliably disposed at a position where the color reference board 103 faces against the glass plate 101b.

Of the corners of the plurality of color reference boards 103, two corner, which is located on a side opposite to the side on which the protruding portion 103b is formed, abut against the stoppers 102e. In this manner, the plurality of color reference boards 103 are fixed, and misalignment of the plurality of color reference boards 103 may be prevented.

In this condition, the magnet member 103g of each color reference board 103 and the magnetic member 102c of the document cover 102 are attracted to each other; consequently, the plurality of color reference boards 103 are stuck to the document cover 102 and held.

Figure 6A:
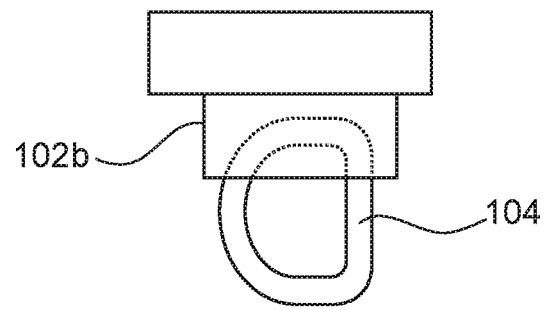
FIG. 6A is a schematic diagram of a locking member 102b and the ring member 104.
Figure 6B:
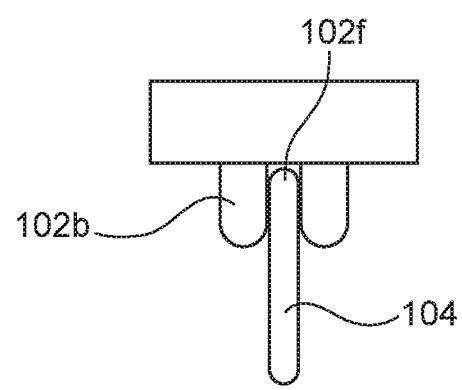
FIG. 6B is a schematic diagram of the locking member 102b and the ring member 104.

FIGS. 6A and 6B are schematic diagrams for describing a relationship between the locking member 102b and the ring member 104. FIG. 6A is a schematic diagram of the locking member 102b and the ring member 104 viewed from a direction of an arrow A3 in FIG. 5 while FIG. 6B is a schematic diagram of the locking member 102b and the ring member 104 viewed from a direction of an arrow A4 in FIG. 5.

As illustrated in FIG. 6A and FIG. 6B, by fitting the ring member 104 in the recessed portion 102f of the locking member 102b, the ring member 104 is locked by the locking member 102b. The ring member 104 may have any shape as long as the ring member 104 can be locked in the locking member 102b, and it may be rectangular or circular.

Figure 6C:
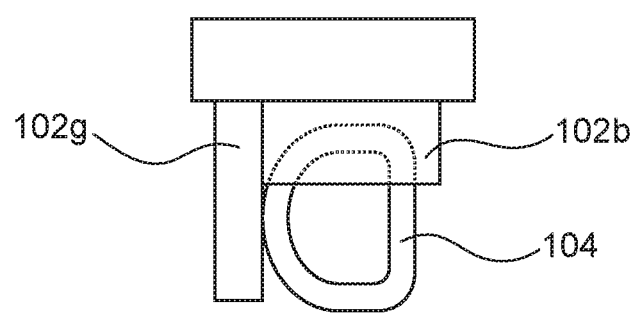
FIG. 6C is a schematic diagram for describing another example of the locking member 102b.

FIG. 6C is a schematic diagram for describing another example of the locking member 102b.

In the example illustrated in FIG. 6C, the document cover 102 is provided with an abutment portion 102g against which the ring member 104 locked in the locking member 102b abuts. By configuring the ring member 104 to abut against the abutment portion 102g, the position of the plurality of color reference boards 103 relative to the document cover 102 (particularly a position in a direction of an arrow A2 in FIG. 5) can be fixed. In this manner, the color reference board 103 may be more reliably disposed at a position where the color reference board 103 faces against the glass plate 101b. In this case, by making the shape of the ring member 104 to be rectangular, joint surfaces of the abutment portion 102g and the ring member 104 can be enlarged; thus, the position of the plurality of color reference boards 103 relative to the document cover 102 can be kept more stable.

A user can easily switch the color reference board 103 that faces against the glass plate 101b among the plurality of color reference boards 103, and the user can flexibly change the plurality of color reference boards 103 according to a background color of a document to be read.

The user may close the document cover 102 after placing the plurality of color reference boards 103 on the glass plate 101b of the housing 101 in a state in which the document cover 102 is open. In this case, when the document cover 102 is closed, the ring member 104 is fitted in the locking member 102b and the plurality of color reference boards 103 are attached to the document cover 102. In this manner, the user can easily set the plurality of color reference boards 103 on the document cover 102.

In this case, the upper surface of the housing 101 may be provided with an abutment portion against which one or more of the corners of the plurality of color reference boards 103 abut. In this manner, the user can place the plurality of color reference boards 103 at an appropriate position on the housing 101, and the user can more reliably attach the plurality of color reference boards 103 to the document cover 102.

Figure 7:
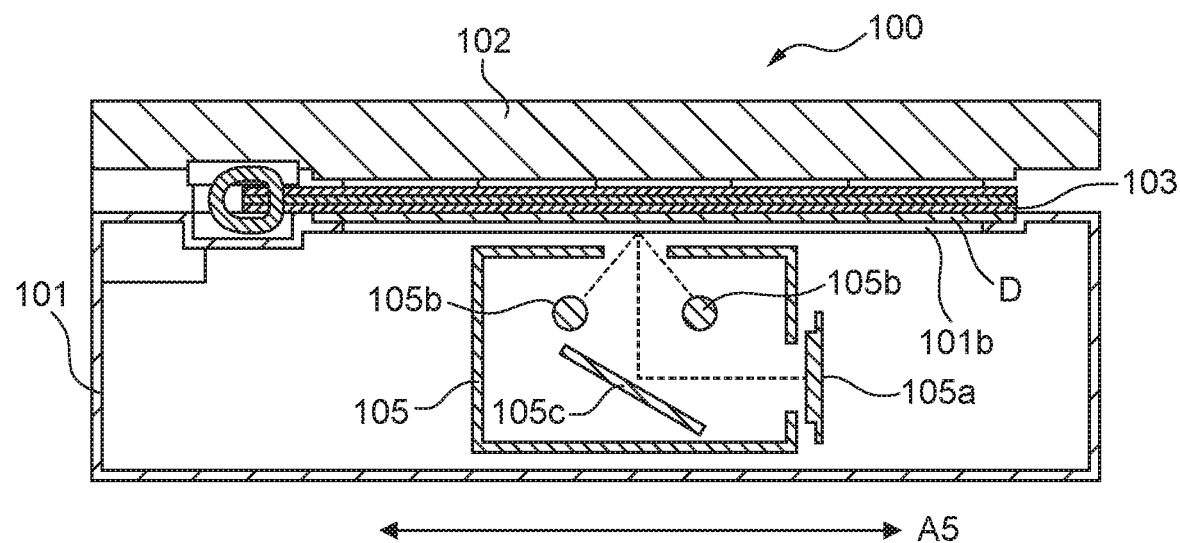
FIG. 7 is a cross-sectional view of the document reading apparatus illustrated in FIG. 1 taken along a line A-A'.

FIG. 7 is a cross-sectional view of the document reading apparatus when the document cover 102 is closed taken along a line A-A' in FIG. 1.

As illustrated in FIG. 7, the housing 101 includes an imaging unit 105. The imaging unit 105 is set at a position where the imaging unit 105 faces, across the glass plate 101b, against the closed document cover 102 and the plurality of color reference boards 103 attached to the document cover 102. The imaging unit 105 extends in a direction parallel to the glass plate 101b and perpendicular to a direction of an arrow A5 in FIG. 7 in such a way that the imaging unit 105 can image the glass plate 101b from one end to the other end. The imaging unit 105 is set in such a way that the imaging unit 105 can move along the direction of the arrow A5 in FIG. 7 to image the glass plate 101b from one end to the other end.

The imaging unit 105 includes an imaging device 105a, a lighting device 105b, a mirror 105c, etc.

The imaging device 105a is an example of a document reading module. The imaging device 105a includes an imaging sensor of a reducing optical system type that includes image sensing elements using a CCD (Charge Coupled Device) linearly arranged in a main scanning direction. The imaging sensor images a document D placed on the glass plate 101b, generates an analog image signal, and outputs the image signal. Instead of the CCD, a CIS (Contact image Sensor) of an equal magnification optical system type including image sensing elements using a CMOS (Complementary Metal Oxide Semiconductor) may be used.

The lighting device 105b includes a light source that illuminates the document, and is set at a position where the lighting device 105b faces against the glass plate 101b. Light emitted from the lighting device 105b is reflected by the document D placed on the glass plate 101b, and an image is formed on the image sensing elements of the imaging device 105a through the mirror 105c.

Figure 8:
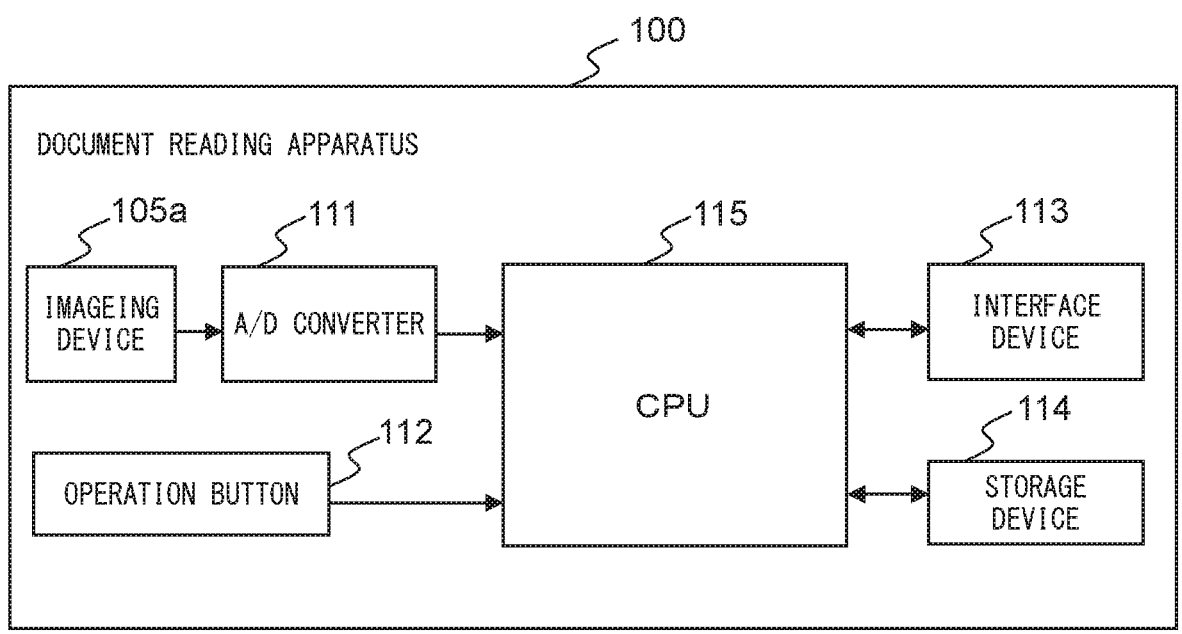
FIG. 8 is a block diagram illustrating a schematic configuration of a document reading apparatus 100.

FIG. 8 is a block diagram illustrating a schematic configuration of the document reading apparatus 100.

The document reading apparatus 100 further includes, in addition to the aforementioned components, an A/D converter 111, an operation button 112, an interface device 113, a storage device 114, a CPU (Central Processing Unit) 115, etc.

The A/D converter 111 performs analog-to-digital conversion of the analog image signal output from the imaging device 105a to generate digital image data, and outputs the image data to the CPU 115. The digital image data is used as a scanned image.

The interface device 113 includes an interface circuit compatible with a serial bus such USB (Universal Serial Bus). The interface device 113 electrically connects to an unillustrated information processing apparatus (for example, a personal computer or a personal digital assistant), and transmits/receives the scanned image and various types of information. Instead of the interface device 113, a communication apparatus including an antenna for transmitting/receiving a radio signal and a wireless communication interface circuit for transmitting/receiving the signal via a wireless communication circuit in accordance with a predetermined communication protocol may be used. The predetermined communication protocol is, for example, a wireless LAN (Local Area Network).

The storage device 11A includes a memory device such as RAM (Random Access Memory) or ROM (Read Only Memory), a fixed disk device such as a hard disk drive, or a removable storage device such as a flexible disk drive or an optical disc drive. The storage device 114 stores a computer program, a database, a table, etc., which are used for various types of processing by the document reading apparatus 100. The computer program may be installed on the storage device 114 from a computer-readable, non-transitory medium such as a CD-ROM (compact disc read only memory), a DVD-ROM (digital versatile disc read only memory), or the like by using a well-known setup program or the like. The storage device 114 further stores the scanned image.

The CPU 115 operates in accordance with a program stored in advance in the storage device 114. Instead of the CPU 115, a DSP (digital signal processor), an LSI (large scale integration), etc., may be used. Instead of the CPU 115, an ASIC (Application Specific Integrated Circuit), an FPGA (Field-Programmable Gate Array), etc., may be used.

The CPU 115 is connected to the imaging device 105a, the A/D converter 111, the operation button 112, the interface device 113, the storage device 114, etc., and controls these units. The CPU 115 performs a document reading control of the imaging device 105a, etc., and acquires a scanned image.

As described above in detail, the document reading apparatus 100 enables a user to flexibly-change a plurality of color reference boards 103 according to a background color of a document to be read. Accordingly, the document reading apparatus 100 can appropriately extract or remove an edge of the document from a scanned image or appropriately prevent a show-through of a color reference board. By coupling the plurality of color reference boards 103 together to make a single unit, it is also possible to reduce the size of the color reference board 103, to reduce a space for storage, and to reduce time and workloads for switching between the color reference boards 103. In addition, it is possible to store the plurality of color reference boards 103 altogether, thereby preventing loss of the color reference board.

Second Embodiment

Figure 9:
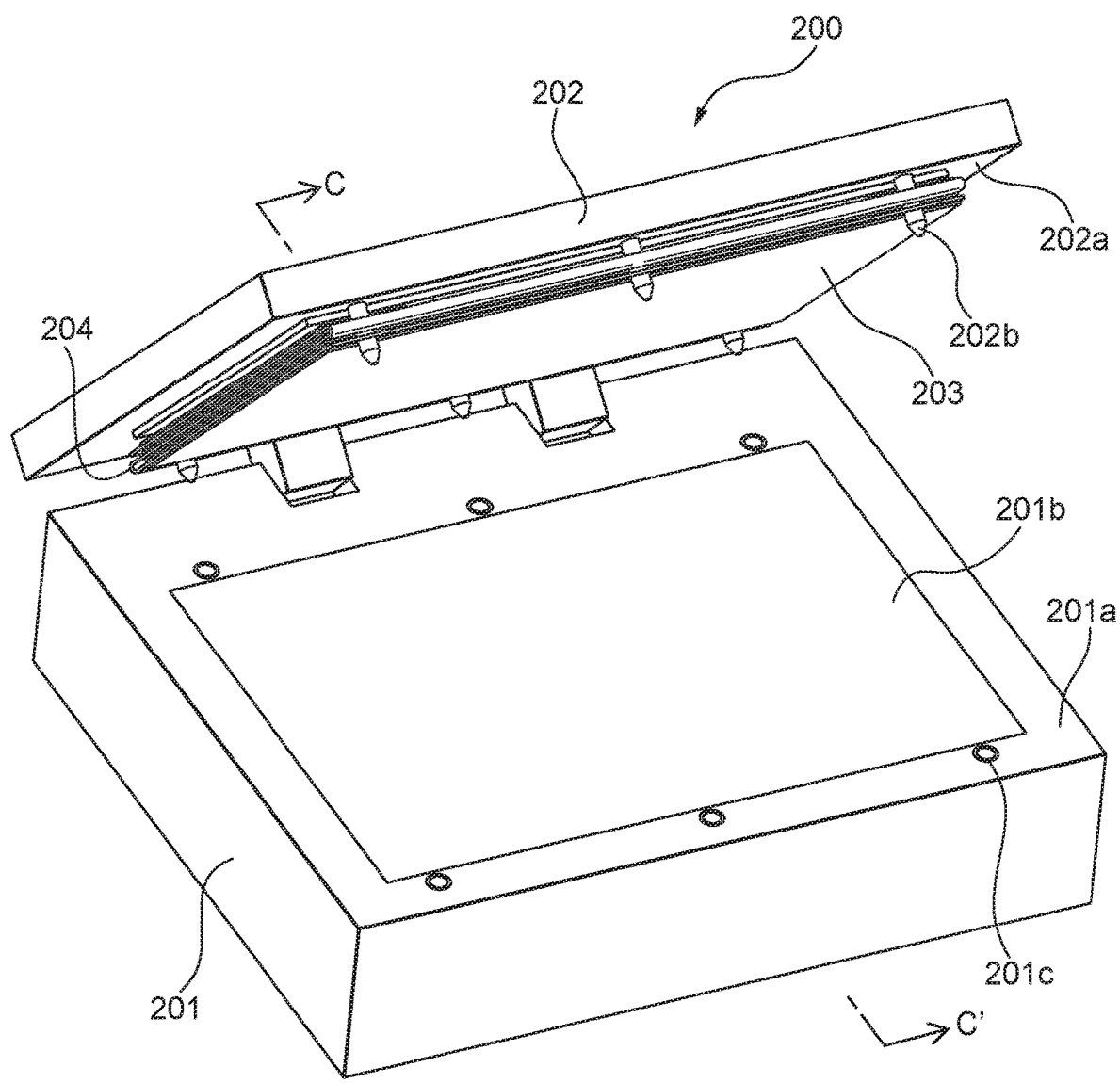
FIG. 9 is a configuration diagram of an example of a document reading apparatus according to a second embodiment.

FIG. 9 is a configuration diagram of an example of a document reading apparatus according to a second embodiment. The document reading apparatus of the present embodiment is configured, similarly to the document reading apparatus 100 according to the first embodiment, as a document reading apparatus 200 such as an image scanner.

The document reading apparatus 200 includes a housing 201, a document cover 202, a plurality of color reference boards 203, a sheet member 204, etc.

The housing 201 includes a glass plate 201b, a recessed portion 201c, etc., in an upper surface 201a.

The glass plate 201b is a member on which a document to be read is placed.

The recessed portion 201c is formed at a position where the glass plate 201b is not disposed on the upper surface 201a and where the recessed portion 201c faces against a protruding member 202b provided in the document cover 202 when the document cover 202 is closed. Since the protruding member 202b is housed in the recessed portion 201c when the document cover 202 is closed, the color reference board 203 can appropriately come into contact with the glass plate 201b.

The document cover 202 is set up in such a way that it can be opened and closed relative to the housing 201; when the document cover 202 is open, a document can be placed on the upper surface 201a of the housing 201; when the document cover 202 is closed, an underside 202a of the document cover 202 faces against an imaging unit provided under the glass plate 201b (inside the housing 201).

The document cover 202 includes the protruding member 202b, etc., in the underside 202a. The protruding member 202b is provided at a position where the protruding member 202b faces against the recessed portion 201c formed in the housing 201 when the document cover 201 is closed.

The plurality of color reference boards 203 are set up to be detachable relative to the document cover 202 on the underside 202a of the document cover 202.

The sheet member 204 is an example of a coupling portion and couples the plurality of color reference boards 203 together.

Figure 10A:
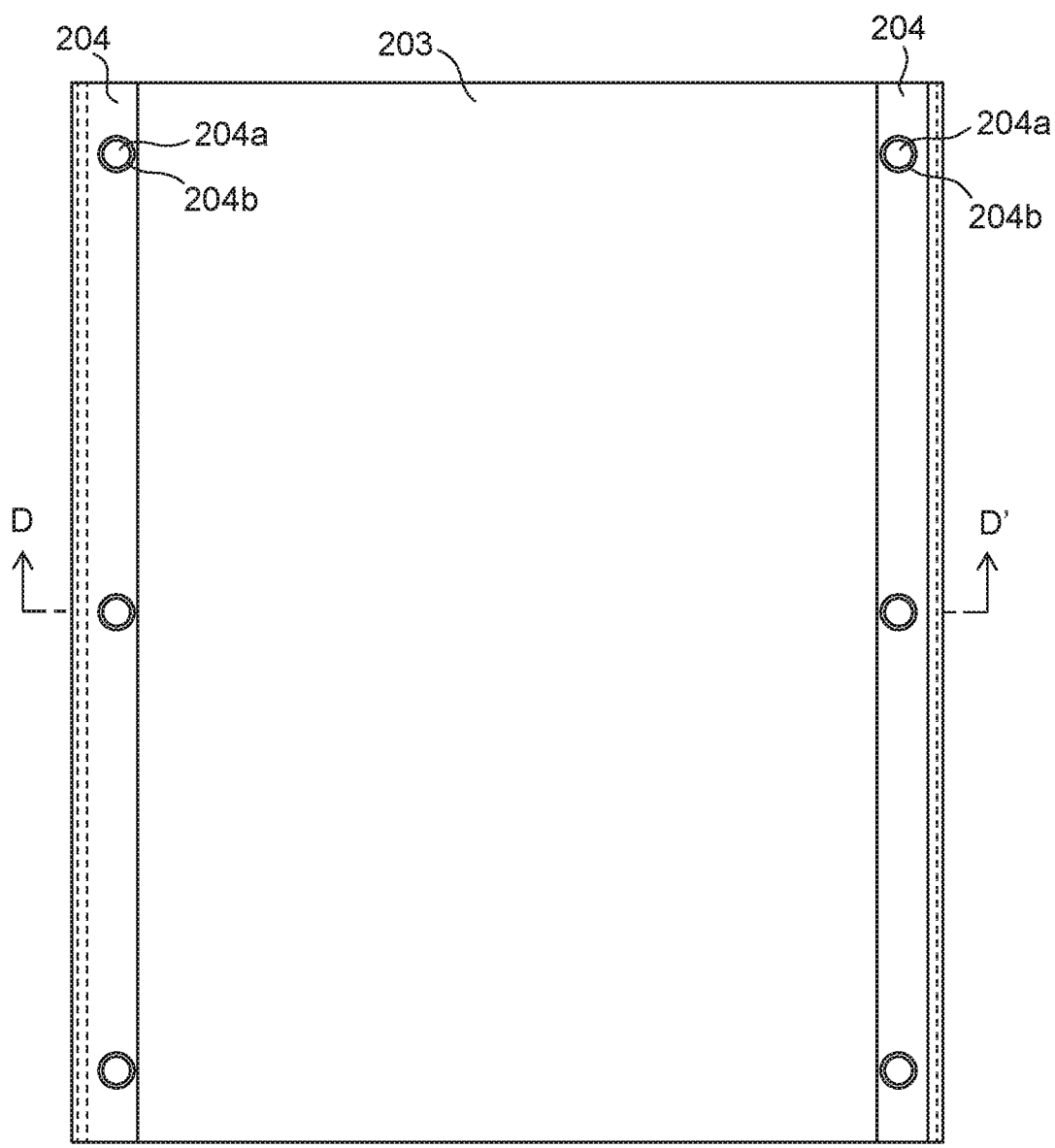
FIG. 10A is a plan view of a plurality of color reference boards 203 and a sheet member 204.
Figure 10B:
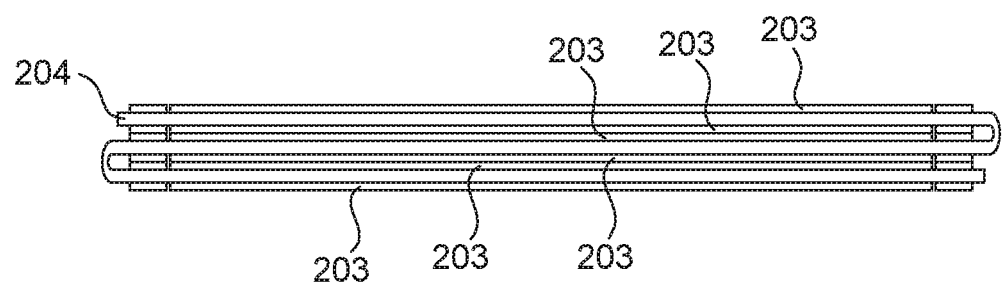
FIG. 10B is a cross-sectional view of a plurality of color reference boards 203 and the sheet member 204 illustrated in FIG. 10A taken along a line D-D'.

FIGS. 10A and 10B are diagrams for describing the plurality of color reference boards 203 and the sheet member 204, and illustrates the plurality of color reference boards 203 and the sheet member 204 when they are detached from the document cover 202. FIG. 10A is a plan view of the plurality of color reference boards 203 and the sheet member 204 while FIG. 10B is a cross-sectional view of the plurality of color reference boards 203 and the sheet member 204 illustrated in FIG. 10A taken along a line D-D'.

As illustrated in FIGS. 10A and 10B, the plurality of color reference boards 203 include six color reference boards 203. The number of the plurality of color reference boards 203 may be any number as long as it is two or more. Each color reference board 203 is formed to be planar, and has a substantially rectangular shape.

The sheet member 204 is formed to be planar, and is a flexible member having a substantially rectangular shape. The sheet member 204 is a magnet member, which is a permanent magnet such an alnico magnet, a ferrite magnet, or a neodymium magnet. The sheet member 204 can be folded, and in the example illustrated in FIGS. 10A and 10B, it is folded in three for use. The sheet member 204 couples the plurality of color reference boards 203 together by attaching each of the plurality of color reference boards 203, at the center of each folded face of the sheet member 204, to the sheet member 204 with an adhesive, etc. In end portions of each folded face, through-holes 204a are formed. The number of the through-holes 204a may be any number as long as it is one or more. On a circumferential portion of each through-hole 204a, to prevent the through-hole 204a from being worn or damaged, a protector 204b such as a crimped portion, a seal, or a plastic is provided.

A surface of each of the plurality of color reference boards 203, which is not attached to the sheet member 204, may be attached to the document cover 202 in such a way that the surface faces against the imaging unit through the glass plate 201b when the document cover 202 is closed. A surface of each of the plurality of color reference boards 203, which is not attached to the sheet member 204, has different reflectance.

Figure 11:
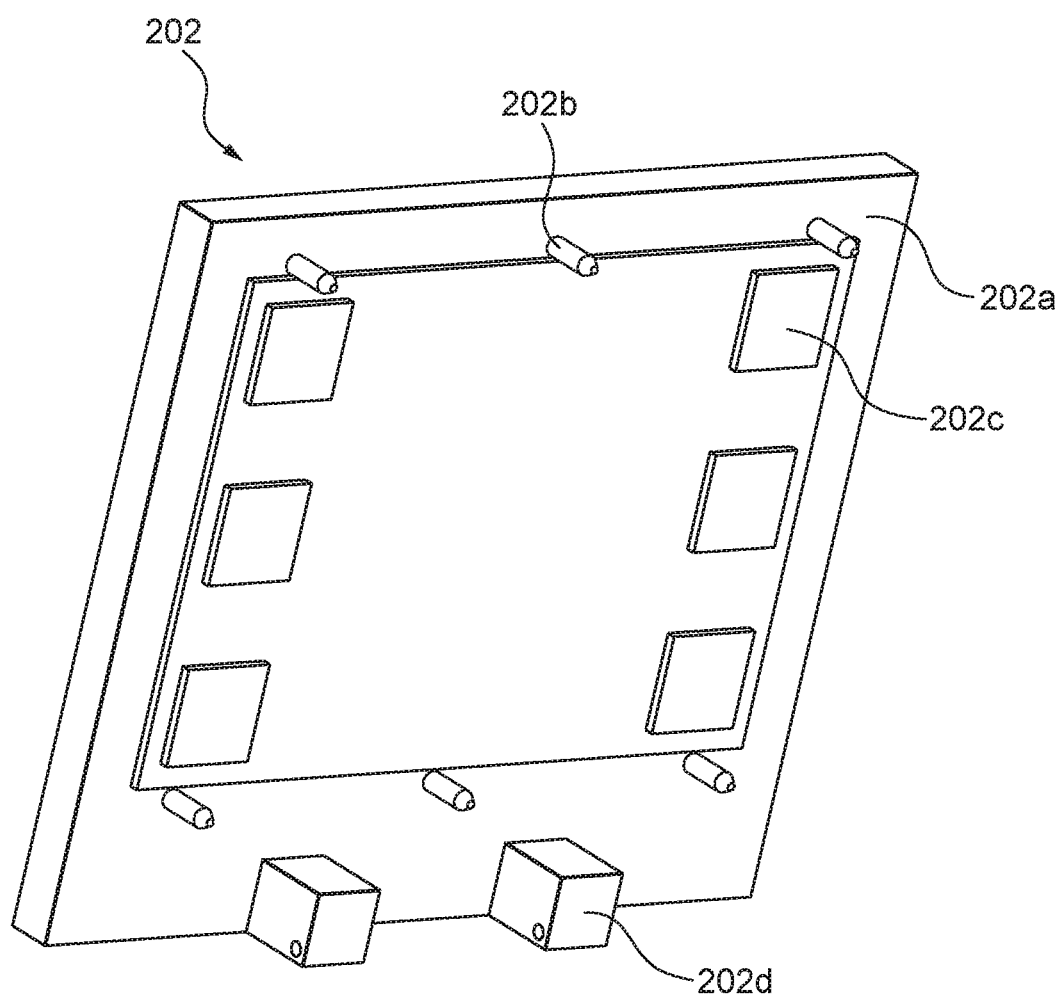
FIG. 11 is a perspective view of a document cover 202 detached from a housing 201, viewed from below.

FIG. 11 is a perspective view of the document cover 202 detached from the housing 201, viewed from below.

As illustrated in FIG. 11, the document cover 202 includes, on the underside 202a, a protruding member 202b, a magnetic member 202c, engaging members 202d, etc.

The protruding member 202b is an example of an abutment portion, which is provided on the document cover 202, that abuts against the sheet member 204, and locks the sheet member 204. The number of the protruding members 202b to be provided is the same as that of the through-holes 204a in the sheet member 204 in a folded state.

The magnetic member 202c is an example of a portion of the document cover 202. The magnetic member 202c is a magnetic member that attracts and is attracted to the sheet member 204, and is attached to the document cover 202 with an adhesive, etc. The magnetic member 202c is a ferromagnet such as iron, cobalt, nickel, or gadolinium. The number of the magnetic members 202c may be any number as long as it is one or more. The document cover 202 and the sheet member 204 may be configured any way as long as they are attracted to each other; for example, the document cover 202 may include, instead of the magnetic member 202c, a magnet member that is a permanent magnet. The document cover 202 may include, instead of the magnetic member 202c, a magnet member while the sheet member 204 is a magnetic member, not a magnet member.

The engaging member 202d rotatably engages with the housing 201 in such a way that the document cover 202 can be opened and closed relative to the housing 201.

Figure 12:
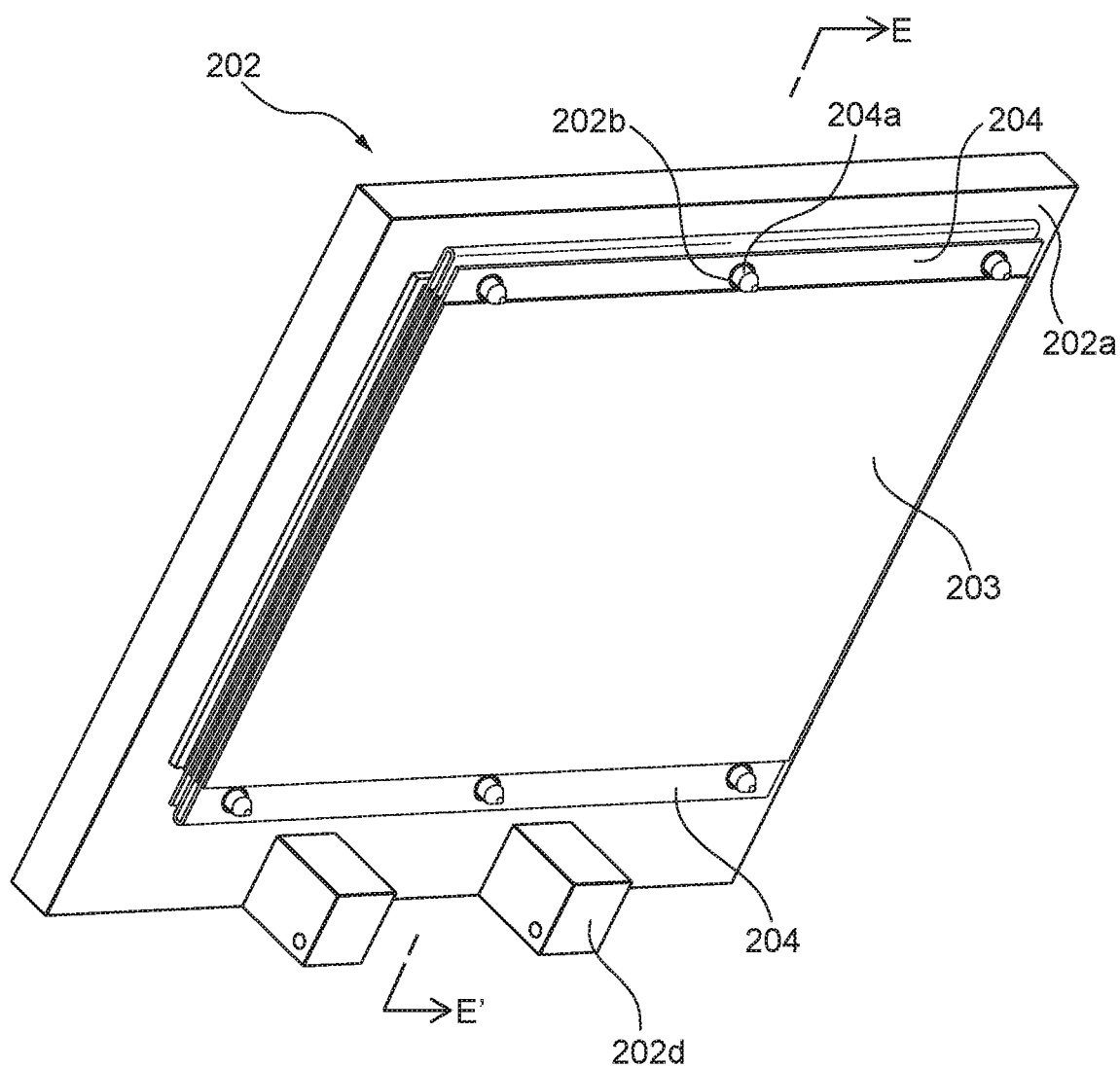
FIG. 12 is a schematic diagram of the document cover 202 and a plurality of color reference boards 203.
Figure 13:
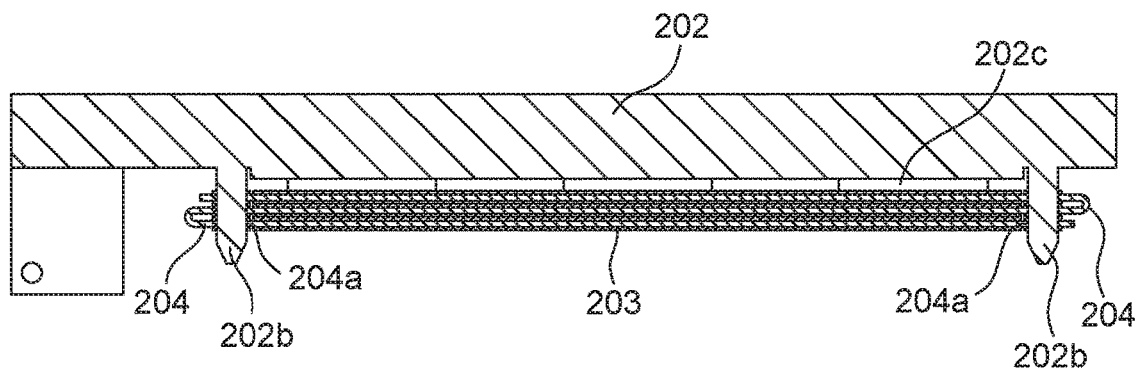
FIG. 13 is a cross-sectional view of the document cover 202 and a plurality of color reference boards 203 illustrated in FIG. 12 taken along a line E-E'.

FIG. 12 is a schematic diagram illustrating a state in which the plurality of color reference boards 203 are attached to the document cover 202 illustrated in FIG. 11. FIG. 13 is a cross-sectional view of the document cover 202 and the plurality of color reference boards 203 illustrated in FIG. 12 taken along a line E-E'.

As illustrated in FIGS. 12 and 13, by configuring the protruding member 202b to pass through the through-hole 204a, the plurality of color reference boards 203 are attached to the document cover 204. The protruding member 202b also serves as a portion for positioning the plurality of color reference boards 203, and by locking the through-hole 204a at a position of the protruding member 202b, the position of the plurality of color reference boards 203 relative to the document cover 202 can be fixed, in this manner, the color reference board 203 may be reliably disposed at a position where the color reference board 203 faces against the glass plate 201b.

In this condition, the sheet member 204 and the magnetic member 202c of the document cover 202 are attracted to each other; consequently, the plurality of color reference boards 203 are stuck to the document cover 202 and held.

A user can easily switch the color reference board 203 that faces against the glass plate 201b among the plurality of color reference boards 203, and the user can flexibly change the plurality of color reference boards 203 according to a background color of a document to be read.

The user may close the document cover 202 after placing the plurality of color reference boards 203 on the glass plate 201b of the housing 201 in a state in which the document cover 202 is open. In this case, when the document cover 202 is closed, the protruding member 202.b passes through the through-hole 204a and the plurality of color reference boards 203 are attached to the document cover 202. In this manner, the user can easily set the plurality of color reference boards 203 on the document cover 202.

In this case, the upper surface of the housing 201 may be provided with an abutment portion against which one or more of the corners of the plurality of color reference boards 203 abut. In this manner, the user can place the plurality of color reference boards 203 at an appropriate position on the housing 201; thus, the user can more reliably attach the plurality of color reference boards 203 to the document cover 202.

Figure 14:
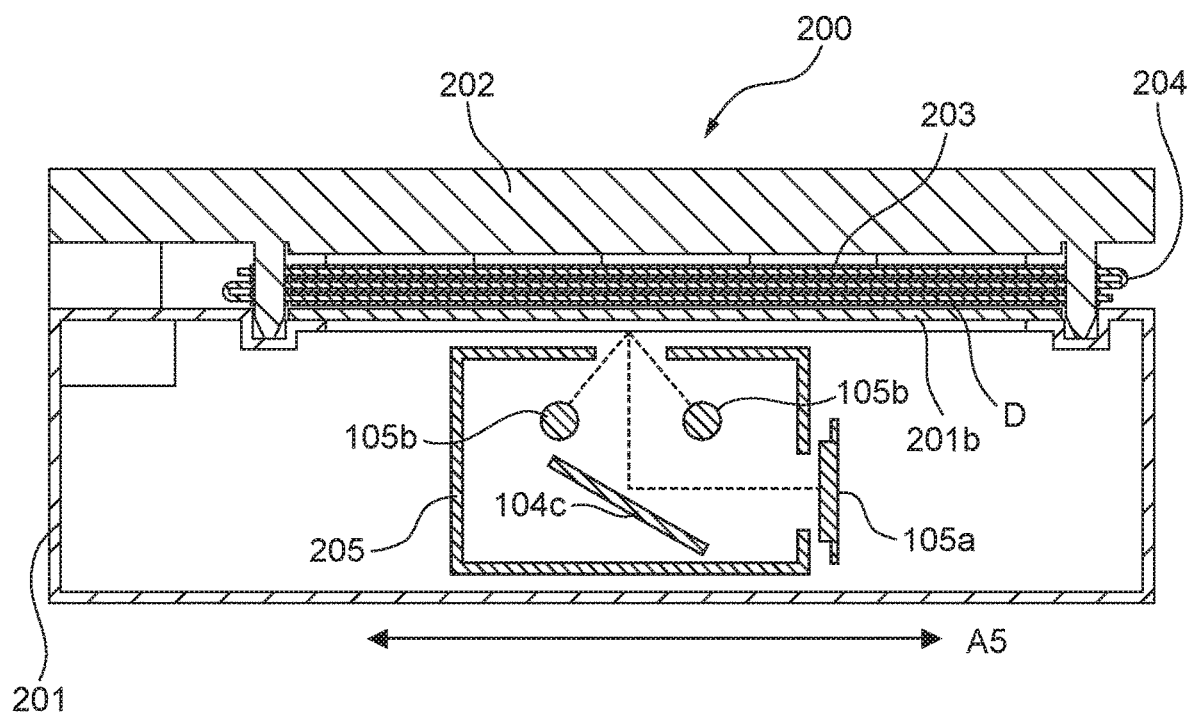
FIG. 14 is a cross-sectional view of the document reading apparatus illustrated in FIG. 9 taken along a line C-C'.

FIG. 14 is a cross-sectional view of the document reading apparatus 200 when the document cover 202 is closed taken along a line C-C' in FIG. 9.

As illustrated in FIG. 14, the housing 201 includes an imaging unit 205. Since the configuration of the imaging unit 205 is similar to that of the imaging unit 105, the detailed description thereof will be omitted.

Since a schematic configuration of the document reading apparatus 200 is similar to that of the document reading apparatus 100, the detailed description thereof will be omitted.

As described above in detail, the document reading apparatus 200 also enables a user to flexibly change the plurality of color reference boards 203 according to a color contained in a document to be read. In addition, the document reading apparatus 200 can achieve an effect similar to that achieved by the document reading apparatus 100.

REFERENCE SIGNS LIST 100, 200 Document reading apparatus
102, 202 Document cover
102b Locking member
102c, 202c Magnetic member
202b Protruding member
103, 203 color reference board
103c, 204a Through-hole
103d, 204b Protector
103g Magnet member
104 Ring member
204 Sheet member

The invention claimed is:

1. A document reading apparatus, comprising:
an imaging device;
a document cover provided at a position where the document cover faces against the imaging device;
an abutment portion provided in the document cover;
a plurality of color reference boards detachably set up relative to the document cover; and
a coupling portion that couples the plurality of color reference boards together and that abuts against the abutment portion,
wherein each of the plurality of color reference boards includes a surface that faces against the imaging device and that has different reflectance.

2. The document reading apparatus according to claim 1, wherein the coupling portion is a ring member configured to pass through a through-hole formed in each of the plurality of color reference boards to couple the plurality of color reference boards together, and
wherein the abutment portion is a locking member that locks the ring member.

3. The document reading apparatus according to claim 2, wherein one of the document cover or the plurality of color reference boards includes a magnet member, and
wherein the other of the document cover or the plurality of color reference boards includes a magnet member or a magnetic member that attracts and is attracted to the one of the document cover or the plurality of color reference boards.

4. The document reading apparatus according to claim 2, wherein a circumferential portion of the through-hole is provided with a protector.

5. The document reading apparatus according to claim 1,
wherein the coupling portion is a flexible sheet member that couples the plurality of color reference boards together by attaching the plurality of color reference boards to the coupling portion and in which a through-hole is formed, and
wherein the abutment portion is a protruding member configured to pass through the through-hole.

6. The document reading apparatus according to claim 5,
wherein one of a portion of the document cover or the coupling portion is a magnet member, and
wherein the other of a portion of the document cover or the coupling portion is a magnet member or a magnetic member that attracts and is attracted to the one of a portion of the document cover or the coupling portion.

\* \* \* \* \*